(12) United States Patent
Arisi et al.

(10) Patent No.: US 11,753,944 B2
(45) Date of Patent: Sep. 12, 2023

(54) AIRFOIL WITH WALL THAT TAPERS IN THICKNESS

(71) Applicant: United Technologies Corporation, Farmington, CT (US)

(72) Inventors: Allan N. Arisi, Manchester, CT (US); Tracy A. Propheter-Hinckley, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 428 days.

(21) Appl. No.: 16/594,353

(22) Filed: Oct. 7, 2019

(65) Prior Publication Data

US 2020/0332662 A1    Oct. 22, 2020

Related U.S. Application Data

(60) Provisional application No. 62/757,989, filed on Nov. 9, 2018.

(51) Int. Cl.
| | |
|---|---|
| *F01D 5/18* | (2006.01) |
| *F01D 25/12* | (2006.01) |
| *F02C 7/18* | (2006.01) |

(52) U.S. Cl.
CPC ............. *F01D 5/186* (2013.01); *F01D 5/187* (2013.01); *F01D 25/12* (2013.01); *F02C 7/18* (2013.01); *F05D 2220/32* (2013.01); *F05D 2260/201* (2013.01); *F05D 2260/204* (2013.01)

(58) Field of Classification Search
None
See application file for complete search history.

(56) References Cited

U.S. PATENT DOCUMENTS

| | | |
|---|---|---|
| 5,702,232 A | 12/1997 | Moore |
| 6,773,230 B2 | 8/2004 | Bather et al. |
| 7,670,112 B2 | 3/2010 | Boury et al. |
| (Continued) | | |

FOREIGN PATENT DOCUMENTS

| | | |
|---|---|---|
| EP | 1847684 | 10/2007 |
| GB | 2523140 | 8/2015 |

OTHER PUBLICATIONS

European Search Report for European Patent Application No. 19208400.2 completed Dec. 20, 2019.

*Primary Examiner* — Eldon T Brockman
*Assistant Examiner* — Jason Fountain
(74) *Attorney, Agent, or Firm* — Carlson. Gaskey & Olds, PC.

(57) ABSTRACT

An airfoil section has an airfoil wall that defines a leading end, a trailing end, and first and second sides that join the leading end and the trailing end. The airfoil wall circumscribes an internal core cavity. A skincore passage is embedded in the first side of the airfoil wall between inner and outer portions of the first side of airfoil wall. The skincore passage defines a passage forward edge and a passage aft edge. The first side of the airfoil wall has a portion that tapers in thickness at the passage aft edge. A cooling passage is embedded in the second side of the airfoil wall between inner and outer portions of the second side of airfoil wall. The inner portion of the second side of the airfoil wall includes a protrusion located across the internal core cavity from the portion of the first side that tapers in thickness.

19 Claims, 2 Drawing Sheets

(56) References Cited

U.S. PATENT DOCUMENTS

| | | | |
|---|---|---|---|
| 7,717,676 B2* | 5/2010 | Cunha | B22C 9/103 |
| | | | 416/97 R |
| 7,980,819 B2* | 7/2011 | Albert | B22C 9/04 |
| | | | 416/97 R |
| 9,879,554 B2* | 1/2018 | Kim | F01D 5/189 |
| 10,677,079 B2* | 6/2020 | Propheter-Hinckley | ................... |
| | | | F01D 5/28 |
| 2008/0138209 A1* | 6/2008 | Cunha | F01D 5/186 |
| | | | 416/97 R |
| 2008/0226462 A1* | 9/2008 | Albert | B22C 9/04 |
| | | | 416/97 R |
| 2014/0033736 A1 | 2/2014 | Propheter-Hinckley et al. | |
| 2016/0201489 A1* | 7/2016 | Kim | F01D 5/189 |
| | | | 415/177 |
| 2018/0135446 A1* | 5/2018 | Propheter-Hinckley | ................... |
| | | | F01D 9/065 |
| 2020/0024965 A1* | 1/2020 | Frey | F01D 5/187 |

* cited by examiner

AIRFOIL WITH WALL THAT TAPERS IN THICKNESS

CROSS-REFERENCE TO RELATED APPLICATION

This application claims priority to U.S. Provisional Application No. 62/757,989 filed Nov. 9, 2018.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

The high pressure turbine drives the high pressure compressor through an outer shaft to form a high spool, and the low pressure turbine drives the low pressure compressor through an inner shaft to form a low spool. The fan section may also be driven by the low inner shaft. A direct drive gas turbine engine includes a fan section driven by the low spool such that the low pressure compressor, low pressure turbine and fan section rotate at a common speed in a common direction.

SUMMARY

An airfoil according to an example of the present disclosure includes an airfoil section that has an airfoil wall that defines a leading end, a trailing end, and first and second sides that join the leading end and the trailing end. The first and second sides span in a longitudinal direction between first and second ends. The airfoil wall circumscribes an internal core cavity. A skincore passage is embedded in the first side of the airfoil wall between inner and outer portions of the first side of airfoil wall. The skincore passage defines a passage forward edge and a passage aft edge. The first side of the airfoil wall has a portion that tapers in thickness at the passage aft edge. A cooling passage is embedded in the second side of the airfoil wall between inner and outer portions of the second side of airfoil wall. The inner portion of the second side of the airfoil wall includes a protrusion across the internal core cavity from the portion of the first side that tapers in thickness.

In a further embodiment of any of the foregoing embodiments, the portion that tapers in thickness and the protrusion define there between a converging throat in the internal core cavity.

In a further embodiment of any of the foregoing embodiments, outer portion of the first side of the airfoil wall has a thickness t2 and the portion that tapers defines a thickness t1 aft of the aft edge, and t1 is greater than t2.

In a further embodiment of any of the foregoing embodiments, t1 is less than 200% of t2.

In a further embodiment of any of the foregoing embodiments, the outer portion of the second side of the airfoil wall is locally thicker at the protrusion.

In a further embodiment of any of the foregoing embodiments, the airfoil section includes a rib partitioning the internal core cavity into a forward cavity and a trailing cavity, and the protrusion is in the trailing cavity.

In a further embodiment of any of the foregoing embodiments, the trailing cavity constantly converges toward the trailing end of the airfoil section.

In a further embodiment of any of the foregoing embodiments, the protrusion has an apex, a forward side, and an aft side, and the forward side is steeper than the aft side.

In a further embodiment of any of the foregoing embodiments, the first side is a suction side and the second side is a pressure side.

In a further embodiment of any of the foregoing embodiments, the portion that tapers in thickness and the protrusion define there between a converging throat in the internal core cavity.

In a further embodiment of any of the foregoing embodiments, outer portion of the first side of the airfoil wall has a thickness t2 and the portion that tapers defines a thickness t1 aft of the aft edge, and t1 is greater than t2.

In a further embodiment of any of the foregoing embodiments, the protrusion includes an undercut.

A gas turbine engine according to an example of the present disclosure includes a compressor section, a combustor in fluid communication with the compressor section, and a turbine section in fluid communication with the combustor. The turbine section has a turbine airfoil according to any of the foregoing embodiments.

In a further embodiment of any of the foregoing embodiments, the portion that tapers in thickness and the protrusion define there between a converging throat in the internal core cavity.

In a further embodiment of any of the foregoing embodiments, outer portion of the first side of the airfoil wall has a thickness t2 and the portion that tapers defines a thickness t1 aft of the aft edge, and t1 is greater than t2.

In a further embodiment of any of the foregoing embodiments, t1 is less than 200% of t2.

In a further embodiment of any of the foregoing embodiments, the outer portion of the second side of the airfoil wall is locally thicker at the protrusion.

In a further embodiment of any of the foregoing embodiments, the airfoil section includes a rib partitioning the internal core cavity into a forward cavity and a trailing cavity, and the protrusion is in the trailing cavity.

In a further embodiment of any of the foregoing embodiments, the trailing cavity constantly converges toward the trailing end of the airfoil section.

In a further embodiment of any of the foregoing embodiments, the protrusion has an apex, a forward side, and an aft side, and the forward side is steeper than the aft side.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
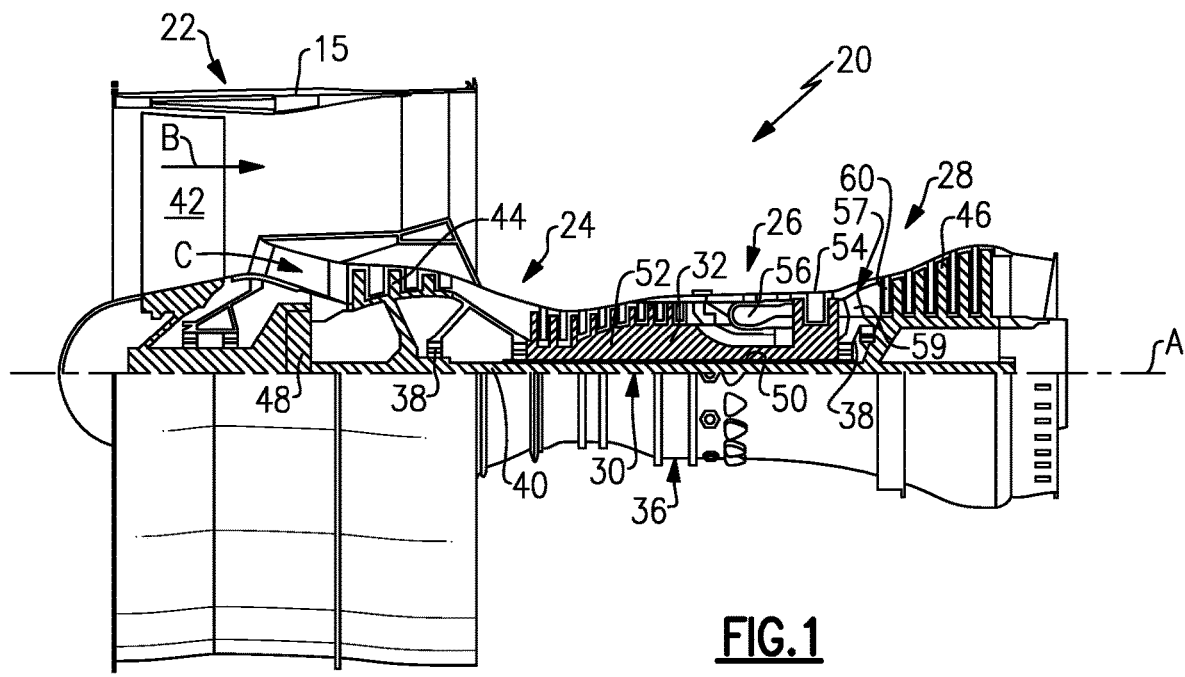
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 meters/second).

Figure 2:
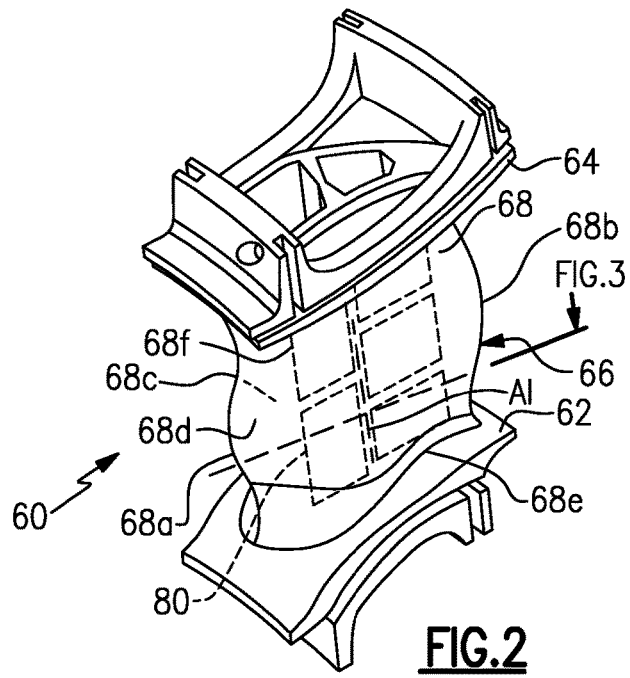
FIG. 2 illustrates an example airfoil of the engine of FIG. 1.

FIG. 2 illustrates a representative example of a turbine airfoil 60 used in the turbine engine 20 (see also FIG. 1). As shown, the turbine airfoil 60 is a turbine vane; however, it is to be understood that, although the examples herein may be described with reference to the turbine vane, this disclosure is also applicable to turbine blades and turbine vanes in other locations than shown.

The turbine airfoil 60 includes an inner or first platform 62, an outer or second platform 64, and an airfoil section 66 that spans in a longitudinal direction A1 (which is also a radial direction relative to the engine central axis A) between the first and second platforms 62/64. Terms such as "radially," "axially," or variations thereof are used herein to designate directionality with respect to the engine central axis A.

Figure 3:
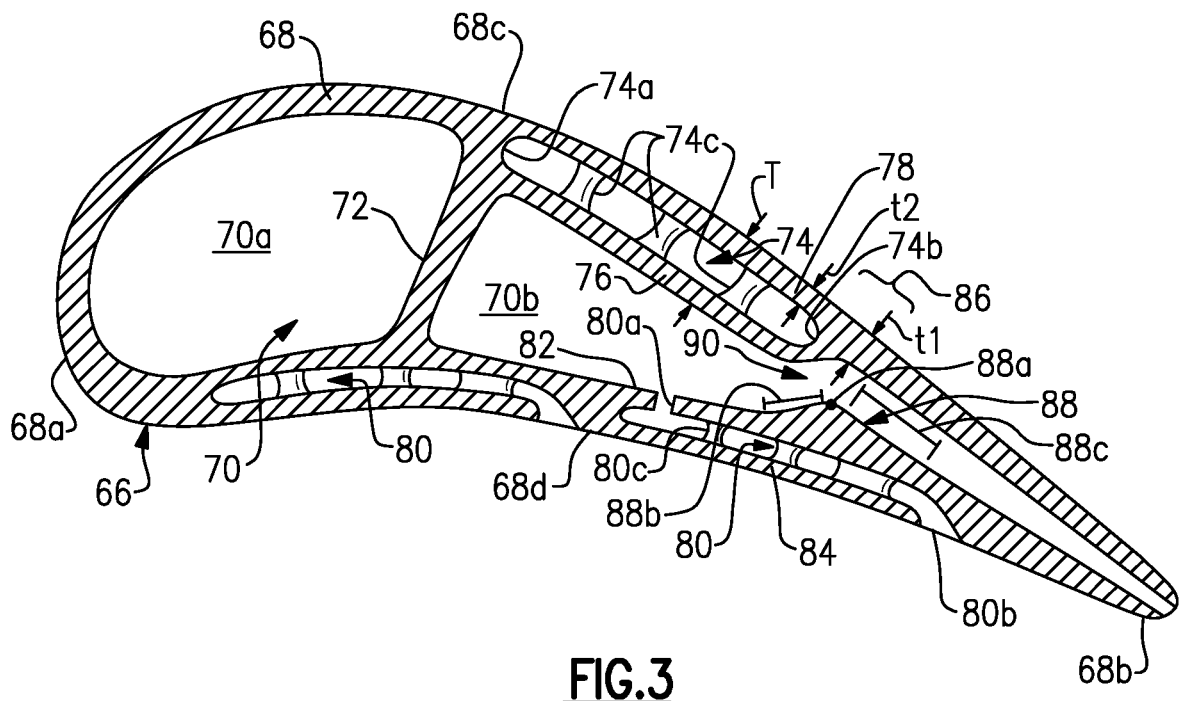
FIG. 3 illustrates a sectioned view of the airfoil of FIG. 2.

The airfoil section 66 includes an airfoil outer wall 68 that delimits the profile of the airfoil section 66. The outer wall 68 defines a leading end 68a, a trailing end 68b, and first and second sides 68c/68d that join the leading and trailing ends 68a/68b. The first and second sides 68c/68d span in the longitudinal direction between first and second ends 68e/68f. The first and second ends 68e/68f are attached, respectively, to the first and second platforms 62/64. In this example, the first side 68c is a suction side and the second side 68d is a pressure side. As shown in a sectioned view through the airfoil section 66 in FIG. 3, the outer wall 68 circumscribes an internal core cavity 70. In this example, the airfoil section 66 includes a rib 72 that partitions the cavity 70 into a forward core cavity 70a and a trailing core cavity 70b.

The airfoil section 66 further includes a skincore passage 74 embedded in the first side 68c between inner and outer portions 76/78 of the first side 68c of the airfoil wall 68. The skincore passage 74 is a cooling passage network and may also be referred to as a skincore. A "skincore" or "skincore passage" is a reference to the thin investment casting core or cores that is/are typically used to make such embedded passages, as opposed to a main core that is used to form a main or central core cavity in an airfoil. The skincore passage 74 is longitudinally elongated and generally extends from the first end 68e to the second end 68f. The skincore passage 74 defines and is bounded by a forward edge 74a and an aft edge 74b. As an example, the edges 74a/74b may be parallel. The skincore passage 74 may include radially elongated ribs 74c that partition the skincore passage 74 into radially elongated sub-passages.

There is at least one cooling passage network 80 embedded in the second side 68d of the airfoil outer wall 68 between inner and outer portions 82/84 of the airfoil wall 68. In the example shown (e.g., see FIG. 2), the airfoil section 66 includes an array of cooling passages networks 80 embedded in the second side 68d. The cooling passage networks 80 may also be referred to as minicores or minicore passages. A "minicore" or "minicore passage" is a reference to the small investment casting core that is typically used to make such an embedded passage, as opposed to a main core that is used to form a main or central core cavity in an airfoil.

Each cooling passage network 80 includes one or more inlet orifices 80 that open through the inner portion 82 of the airfoil wall 68 to the internal core cavity 70 and one or more outlet orifices 80b that open through the outer portion 84 of the airfoil wall 68 to the exterior of the airfoil section 66. The cooling passage network 80 may include an array of flow guides and/or pedestals 80c between the inlet 80a and the outlet 80b. The inlet orifices 80a generally open into a radially-elongated manifold region of the cooling passage network 80, which serves to distribute the cooling air to sub-passages between the pedestals 80c. For instance, the pedestals 80c can be provided in radially-aligned rows, where the rows are radially offset.

During operation, the cooling air is provided to the internal core cavity 70, such as bleed air from the compressor section 24. The cooling air flows from the internal core cavity 70 into the inlet orifices 80a of the networks 80. The cooling air flows through the networks 80 to the outlet orifice or orifices 80b, where the cooling air can be discharged to the exterior surface of the outer wall 68 for film cooling. Cooling air may also be fed, either from the core cavity 70 or from one of the platforms 62/64, to the skincore passage 74 to cool the first side 68c of the airfoil wall 68. Most typically, the cooling air in the skincore cavity 74 will exit to the other of the platforms 62/64 and then be discharged into the core gaspath through one or more orifices in the platform 62/64.

The first side 68c of the airfoil wall 68 has a portion 86 that tapers in thickness at the aft edge 74b of the skincore passage 74. The inner portion 82 of the second side 68d of the airfoil wall 68 includes a protrusion 88 that is located across the internal core cavity 70 from the portion 86 of the first side 68c that tapers in thickness. As used herein, "across" refers to laterally across, in a direction generally perpendicular to the camber line of the airfoil section 66. For instance, the protrusion 88 is formed by a locally thicker region of the inner portion 82 of the second side 68d of the airfoil wall 68. In one example, the protrusion 88 is a radially-elongated ridge that is radially coextensive or substantially radially coextensive with the radial span of the skincore passage 74.

The protrusion 88 and the portion 86 that tapers facilitate cooling of the airfoil section 66. For instance, the airfoil wall 68 has a thickness T across the skincore passage 74 from the exterior surface of the outer portion 78 to the interior surface of the inner portion 76 that borders the cavity 70b. At the aft edge 74b of the skincore passage 74, where the skincore passage 74 terminates, if the airfoil wall 68 were to continue to have the thickness T there would be a thick, solid wall portion. Such a thick wall portion may be challenging to properly cool. In this regard, the portion 86 tapers to a thickness t1 that is less than the thickness T. The thickness t1 can be taken, for example, at the inflection of the curvature of the wall in the portion 86, or within about 200 micrometers in the aft direction of the inflection. The thickness t1 provides lower mass and is thus easier to properly cool. For example, for structural purposes, the thickness t1 is greater than a thickness t2 of the outer portion 78 of the airfoil wall 68 at the skincore passage 74. In one example, the thickness t1 is less than 200% of t2. In a further example, t1 is also less than 80% of T.

The protrusion 88 also facilitates cooling the portion 86. For instance, the trailing cavity 70b continuously tapers toward the trailing end 68b. At the aft edge 74b of the skincore passage 74 the portion 86 and the protrusion 88 form a converging throat 90 in the trailing cavity 70b. The converging throat 90 turns toward the first side 68c and serves to accelerate cooling air flow and thereby enhance cooling in the portion 86. Further, the protrusion 88 may serve as a ramp to throw cooling air toward the first side 68c. As an example, the protrusion 88 defines an apex 88a, a forward side 88b, and an aft side 88c. The forward side 88b is steeper than the aft side 88c so that cooling air is thrown and deflected off of the protrusion 88 toward the first side 68c and the portion 86.

Figure 4:
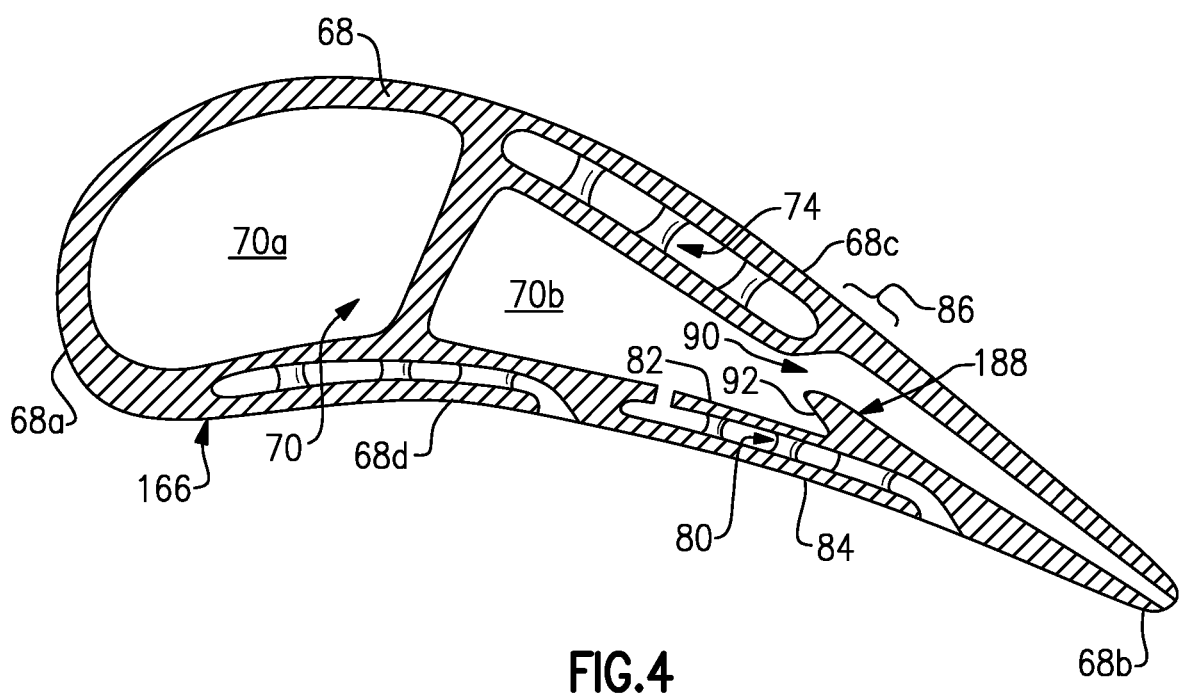
FIG. 4 illustrates another example of an airfoil.

FIG. 4 illustrates another example airfoil section 166. In this disclosure, like reference numerals designate like elements where appropriate and reference numerals with the addition of one-hundred or multiples thereof designate modified elements that are understood to incorporate the same features and benefits of the corresponding elements. In this example, the protrusion 188 is also located across the internal core cavity 70 from the portion 86 of the first side 68c that tapers in thickness. The protrusion 188 is formed by a locally thicker region of the inner portion 82 of the second side 68d of the airfoil wall 68. However, in this example, the protrusion 188 includes an undercut 92. The undercut 92 may radially co-extend with the protrusion 188 or may be intermittent. The undercut 92 serves to reduce mass in the protrusion 188, thereby facilitating cooling and reducing thermal stress near the trailing end of the cooling passage network 80. The undercut 92 may also serve as a trap to capture dirt and debris in the cooling air to reduce clogging in the trailing end 68b where the cooling air exits the airfoil section 66.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. An airfoil comprising:
an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity;
a skincore passage embedded in the first side of the airfoil wall between inner and outer portions of the first side of airfoil wall, the skincore passage defining a passage forward edge and a passage aft edge, the first side of the airfoil wall having a portion that tapers in thickness at the passage aft edge;
a cooling passage network embedded in the second side of the airfoil wall between inner and outer portions of the second side of airfoil wall, the inner portion of the second side of the airfoil wall including a protrusion at the location of the cooling passage network and across the internal core cavity from the portion of the first side that tapers in thickness, the protrusion having an apex, a forward side, and an aft side, and the aft side is longer than the forward side, the cooling passage network including an inlet through the inner portion of the second side of the airfoil wall, an outlet through the outer portion of the second side of the airfoil wall, an array of flow guides between the inlet and the outlet define sub-passages there between, a radially-elongated manifold region into which the inlet opens, and the sub-passages lead from the radially-elongated manifold region.

2. The airfoil as recited in claim 1, wherein the portion that tapers in thickness and the protrusion define there between a converging throat in the internal core cavity.

3. The airfoil as recited in claim 1, wherein the outer portion of the first side of the airfoil wall has a thickness t2 and the portion that tapers defines a thickness t1 aft of the aft edge, and t1 is less than 200% of t2.

4. The airfoil as recited in claim 1, wherein the outer portion of the second side of the airfoil wall is locally thicker at the protrusion.

5. The airfoil as recited in claim 1, wherein the airfoil section includes a rib partitioning the internal core cavity into a forward cavity and a trailing cavity, and the protrusion is in the trailing cavity.

6. The airfoil as recited in claim 5, wherein the trailing cavity constantly converges toward the trailing end of the airfoil section.

7. The airfoil as recited in claim 1, wherein the forward side is steeper than the aft side relative to a portion of the inner portion of the second side of the airfoil wall forward of the apex.

8. The airfoil as recited in claim 1, wherein the portion that tapers in thickness and the protrusion define there between a converging throat in the internal core cavity.

9. The airfoil as recited in claim 8, wherein the outer portion of the first side of the airfoil wall has a thickness t2 and the portion that tapers defines a thickness t1 aft of the aft edge, and t1 is greater than t2.

10. The airfoil as recited in claim 1, wherein the inner portion of the second side of the airfoil wall increases in thickness in an aft direction leading up to the apex and decreases in thickness in the aft direction leading away from the apex.

11. The airfoil as recited in claim 1, wherein the inlet forward of the protrusion and the outlet aft of the protrusion.

12. A gas turbine engine comprising:
a compressor section;
a combustor in fluid communication with the compressor section; and
a turbine section in fluid communication with the combustor,
the turbine section having a turbine airfoil that includes
an airfoil section having an airfoil wall defining a leading end, a trailing end, and first and second sides joining the leading end and the trailing end, the first and second sides spanning in a longitudinal direction between first and second ends, the airfoil wall circumscribing an internal core cavity,
a skincore passage embedded in the first side of the airfoil wall between inner and outer portions of the first side of airfoil wall, the skincore passage defining a passage forward edge and a passage aft edge, the first side of the airfoil wall having a portion that tapers in thickness at the passage aft edge,
a cooling passage network embedded in the second side of the airfoil wall between inner and outer portions of the second side of airfoil wall, the inner portion of the second side of the airfoil wall including a protrusion at the location of the cooling passage network and across the internal core cavity from the portion of the first side that tapers in thickness, the protrusion having an apex, the inner portion of the second side of the airfoil wall increasing in thickness in an aft direction leading up to the apex and decreasing in thickness in the aft direction leading away from the apex, the cooling passage network including an inlet through the inner portion of the second side of the airfoil wall, an outlet through the outer portion of the second side of the airfoil wall, an array of flow guides between the inlet and the outlet define sub-passages there between, a radially-elongated manifold region into which the inlet opens, and the sub-passages lead from the radially-elongated manifold region.

13. The gas turbine engine as recited in claim 12, wherein the portion that tapers in thickness and the protrusion define there between a converging throat in the internal core cavity.

14. The gas turbine engine as recited in claim 13, wherein the outer portion of the first side of the airfoil wall has a thickness t2 and the portion that tapers defines a thickness t1 aft of the aft edge, and t1 is less than 200% of t2.

15. The gas turbine engine as recited in claim 12, wherein the outer portion of the second side of the airfoil wall is locally thicker at the protrusion.

16. The gas turbine engine as recited in claim 12, wherein the airfoil section includes a rib partitioning the internal core cavity into a forward cavity and a trailing cavity, and the protrusion is in the trailing cavity.

17. The gas turbine engine as recited in claim 16, wherein the trailing cavity constantly converges toward the trailing end of the airfoil section.

18. The gas turbine engine as recited in claim 12, wherein the forward side is steeper than the aft side relative to a portion of the inner portion of the second side of the airfoil wall forward of the apex.

19. The gas turbine engine as recited in claim 12, wherein the protrusion has a forward side and an aft side, and the aft side is longer than the forward side.

* * * * *